US011976251B2

(12) United States Patent
Christensen et al.

(10) Patent No.: US 11,976,251 B2
(45) Date of Patent: May 7, 2024

(54) METHOD FOR CONTROLLING LUBRICATION OF A ROTARY SHAFT SEAL

(71) Applicant: EXXONMOBIL TECHNOLOGY AND ENGINEERING COMPANY, Annandale, NJ (US)

(72) Inventors: Gary Christensen, Wenonah, NJ (US); David A. Racke, West Deptford, NJ (US); Mark Sitko, Fort Wayne, IN (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 732 days.

(21) Appl. No.: 16/953,074

(22) Filed: Nov. 19, 2020

(65) Prior Publication Data

US 2021/0190206 A1 Jun. 24, 2021

Related U.S. Application Data

(60) Provisional application No. 62/949,628, filed on Dec. 18, 2019.

(51) Int. Cl.
*C10M 145/34* (2006.01)
*C10M 111/04* (2006.01)
(Continued)

(52) U.S. Cl.
CPC ......... *C10M 145/34* (2013.01); *C10M 111/04* (2013.01); *F16C 3/02* (2013.01);
(Continued)

(58) Field of Classification Search
CPC ............. C10M 111/04; C10M 145/36; C10M 145/34; C10M 145/26; C10M 2209/106;
(Continued)

(56) References Cited

U.S. PATENT DOCUMENTS 2,817,693 A 12/1957 Koome et al.
4,594,172 A 6/1986 Sie
(Continued)

FOREIGN PATENT DOCUMENTS

EP 464546 B1 7/1995
EP 464547 B1 5/1998
(Continued)

*Primary Examiner* — Vishal V Vaisisth
(74) *Attorney, Agent, or Firm* — Vorys, Sater, Seymour and Pease, LLP

(57) ABSTRACT

This disclosure relates to a method for controlling lubrication of a rotary shaft seal. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves increasing the rate of heat flow along the rotary shaft to reduce temperature of the film of lubricating oil in the contact zone. Increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft. This disclosure also relates to a method for controlling heat transfer in a contact zone, and a method for improving performance of an apparatus.

9 Claims, 3 Drawing Sheets

(51) Int. Cl.
*F16C 3/02* (2006.01)
*F16J 15/16* (2006.01)
*C10N 20/02* (2006.01)
*C10N 20/04* (2006.01)
*C10N 30/02* (2006.01)
*C10N 30/18* (2006.01)

(52) U.S. Cl.
CPC .... *F16J 15/162* (2013.01); *C10M 2209/1075* (2013.01); *C10N 2020/02* (2013.01); *C10N 2020/04* (2013.01); *C10N 2030/02* (2013.01); *C10N 2030/18* (2013.01); *F16C 2202/02* (2013.01); *F16C 2202/20* (2013.01); *F16C 2204/00* (2013.01); *F16C 2204/60* (2013.01); *F16C 2206/40* (2013.01); *F16C 2208/00* (2013.01); *F16C 2208/10* (2013.01); *F16C 2300/02* (2013.01)

(58) Field of Classification Search
CPC .... C10M 2203/106; C10M 2203/1006; C10M 2209/108; C10M 2209/105; C10M 2209/1075; F16J 15/162; F16C 33/109; F16C 3/02; F16C 33/6688; F16C 2202/20; F16C 2300/02; F16C 2206/40; F16C 2208/00; F16C 2204/60; F16C 2202/02; F16C 2208/10; F16C 2204/00; C10N 2020/02; C10N 2030/18; C10N 2020/04; C10N 2030/02
See application file for complete search history.

(56) References Cited

U.S. PATENT DOCUMENTS

| | | |
|---|---|---|
| 4,767,551 A | 8/1988 | Hunt et al. |
| 4,827,064 A | 5/1989 | Wu |
| 4,827,073 A | 5/1989 | Wu |
| 4,897,178 A | 1/1990 | Best et al. |
| 4,921,594 A | 5/1990 | Miller |
| 4,943,672 A | 7/1990 | Hamner et al. |
| 4,952,739 A | 8/1990 | Chen |
| 4,956,122 A | 9/1990 | Watts et al. |
| 4,975,177 A | 12/1990 | Garwood et al. |
| 5,075,269 A | 12/1991 | Degnan et al. |
| 6,034,039 A | 3/2000 | Gomes et al. |
| 6,080,301 A | 6/2000 | Berlowitz et al. |
| 6,090,989 A | 7/2000 | Trewella et al. |
| 6,165,949 A | 12/2000 | Berlowitz et al. |
| 7,704,930 B2 | 4/2010 | Deckman et al. |
| 8,048,833 B2 | 11/2011 | Habeeb et al. |
| 2005/0093246 A1* | 5/2005 | Dietle .................. F16J 15/3244 277/549 |
| 2007/0129268 A1* | 6/2007 | Bell .................... C10M 133/12 508/545 |
| 2008/0020950 A1 | 1/2008 | Gray et al. |

FOREIGN PATENT DOCUMENTS

| | | |
|---|---|---|
| GB | 1350257 A | 4/1974 |
| GB | 1390359 A | 4/1975 |
| GB | 1429494 A | 3/1976 |
| GB | 1440230 A | 6/1976 |

\* cited by examiner

METHOD FOR CONTROLLING LUBRICATION OF A ROTARY SHAFT SEAL

CROSS-REFERENCE TO RELATED APPLICATIONS

This application claims the benefit of U.S. Provisional Application No. 62/949,637, filed on Dec. 18, 2019, the entire contents of which are incorporated herein by reference.

FIELD

This disclosure relates to a method for controlling lubrication of a rotary shaft seal, in particular, a method for controlling heat transfer in a contact zone, which can determine the viscosity and other properties of the lubricating oil in the contact zone, and thereby improve endurance and energy and efficiency of the rotary machine. This disclosure also relates to a method for improving performance of an apparatus (e.g., a rotary machine).

BACKGROUND

A rotary, or reciprocating, machine can feature an enclosed internal mechanism that drives a shaft. In some cases, the shaft can pass through the housing of the machine on one or both ends. In such cases, a rotary shaft seal, sometimes referred to as a lip seal, can be disposed near an exit point to retain a lubricating fluid, such as oil or grease, in the housing as well as prevent ingress of contaminants, such as moisture and dust.

Rotary shaft seals are elastomer (e.g., rubber) components that are used to seal fluids around a rotating shaft. The rotary shaft seal can have an outer diameter that provides a seal against the housing, and a sealing lip that provides a seal against the shaft. The sealing lip should exert a radial load on the shaft that provides sufficient sealing properties without excessive friction or wear. See FIG. 1.

The sealing lip has a sealing edge that is lubricated by a thin film of oil. It is known in industry that the shear of the thin oil film results in a temperature increase under the sealing edge. In industry, it is commonly stated that the temperature of this thin oil film is equal to the bulk oil temperature in the reservoir plus a heating factor due to friction in the sealing zone.

Lack of control of temperature in the sealing zone and the thin film of oil can result in adverse effects. For example, oil viscosity, oil film thickness, and thermal stresses on the rotary shaft seal can all be negatively affected. This in turn negatively affects endurance and energy efficiency of the rotary machine.

It would be desirable to develop a method that can control temperature of the sealing zone and the thin film of oil, in particular, a method that can control viscosity and other properties of oil in the sealing zone, and thereby improve endurance and energy and efficiency of the rotary machine.

SUMMARY

This disclosure relates to a method for controlling lubrication of a rotary shaft seal, in particular, a method for controlling heat transfer in a contact zone, which can determine the viscosity and other properties of the lubricating oil in the contact zone, and thereby improve endurance and energy and efficiency of the rotary machine. This disclosure also relates to a method for improving performance of an apparatus (e.g., a rotary machine).

This disclosure relates in part to a method for controlling lubrication of a rotary shaft seal. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves increasing the rate of heat flow along the rotary shaft to reduce temperature of the film of lubricating oil in the contact zone. Increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

This disclosure also relates in part to a method for controlling heat transfer in a contact zone. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves increasing the rate of heat flow along the rotary shaft to reduce temperature of the film of lubricating oil in the contact zone. Increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

This disclosure further relates in part to a method for improving performance of an apparatus. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves increasing the rate of heat flow along the rotary shaft to reduce temperature of the film of lubricating oil in the contact zone. Increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

This disclosure yet further relates in part to a method for controlling lubrication of a rotary shaft seal. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves decreasing the rate of heat flow along the rotary shaft to increase temperature of the film of lubricating oil in the contact zone. Decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

This disclosure also relates in part to a method for controlling heat transfer in a contact zone. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating the contact zone. The contact zone has a film of lubricating oil. The method also involves decreasing the rate of heat flow along the rotary shaft to increase temperature of the film of lubricating oil in the contact zone. Decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

This disclosure further relates in part to a method for improving performance of an apparatus. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves decreasing the rate of heat flow along the rotary shaft to increase temperature of the film of lubricating oil in the contact zone. Decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

It has been surprisingly found that, in accordance with this disclosure, heat transfer through a rotary shaft is a significant factor in determining the temperature of the lubrication zone for rotary shaft seals, and the manipulation of the heat flow through the rotary shaft can control the temperature of the oil film in the contact zone. Two mechanisms have been found to be important. First, the rate of heat flow along the rotary shaft determines the initial temperature of the oil film under the rotary shaft seal relative to the bulk oil temperature. Second, the rate of heat flow along the rotary shaft determines the extent to which friction from the rotating shaft increases the temperature of the oil film under the rotary shaft seal.

Other objects and advantages of the present disclosure will become apparent from the detailed description that follows.

DETAILED DESCRIPTION

Figure 1:
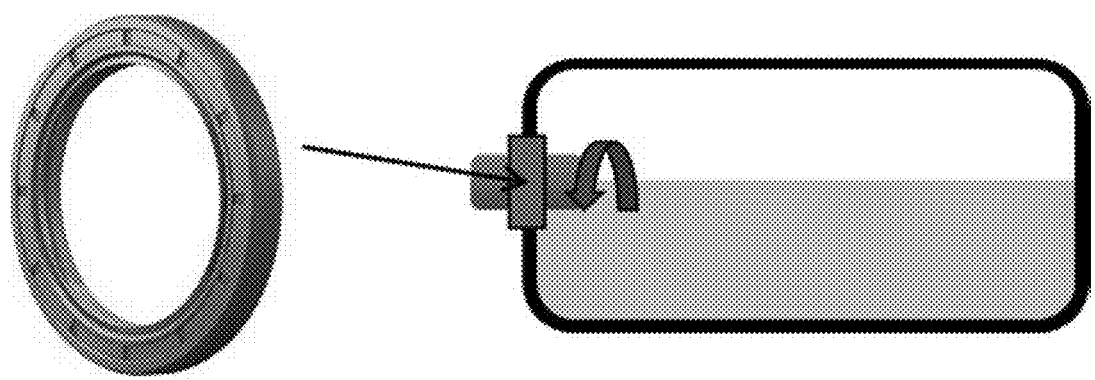
FIG. 1 shows a rotary shaft seal that is used to seal fluids in a reservoir around a rotating shaft.

As used herein, an "apparatus" or a "rotary machine" means any rotary or reciprocating machine having an enclosed internal mechanism that drives a rotary shaft. The rotary shaft can pass through the housing of the machine on one or both ends. A rotary shaft seal can be disposed near an exit point to retain a lubricating fluid, such as oil or grease, in the housing as well as prevent ingress of contaminants, such as moisture and dust.

As used herein, a "rotary shaft" means any rotating shaft that can pass through the housing of a rotary machine on one or both ends. An internal mechanism in the rotary machine drives the rotary shaft. A rotary shaft seal can be disposed on the rotary shaft near an exit point of the housing to retain a lubricating fluid, such as oil or grease, in the housing as well as prevent ingress of contaminants, such as moisture and dust.

As used herein, a "rotary shaft seal" means any seal (e.g., elastomer or rubber) that is used to seal fluids around a rotating shaft in a rotary machine. The rotary shaft seal can have an outer diameter that provides a seal against the housing, and a sealing edge that provides a seal against the rotary shaft. The rotary shaft seal has a sealing edge that is lubricated by a thin film of oil.

In general, this disclosure provides thermal management methods for controlling lubrication of rotary shaft seals.

In accordance with this disclosure, heat transfer through a rotary shaft has been shown to be a significant factor in determining the temperature of the lubrication zone for rotary shaft seals. This disclosure provides methods for controlling this heat transfer, which can determine the viscosity of the lubricant in the contact zone and improve endurance or energy efficiency.

The present disclosure relies on the manipulation of this heat flow to control the temperature of the oil film in the contact zone. Two mechanisms are important. First, the rate of heat flow along the shaft determines the initial temperature of the lubricant film under the seal relative to the bulk oil temperature. Second, the rate of heat flow along the shaft determines the extent to which friction from a rotating shaft increases the temperature of the lubricant film under the sea.

In one embodiment, increasing the rate of heat flow reduces the temperature of the lubricating oil film, resulting in higher viscosity, thicker oil films that can enhance surface protection, and reduced thermal stresses on the seal and oil that can increase the lifetime of the system. Illustrative methods for increasing the heat flow include, for example, using rotary shaft materials with higher thermal conductivity, using rotary shaft coatings with higher thermal conductivities, and adding physical features to the rotary shaft that increase the surface area (such as cooling fins).

In another embodiment, decreasing the rate of heat flow increases the temperature of the lubricating oil film, resulting in reduced fluid friction at the rotary shaft seal and improving energy efficiency of the system. Illustrative methods for decreasing the heat flow include, for example, using rotary shaft materials with lower thermal conductivity, using rotary shaft coatings with lower thermal conductivities, and altering the rotary shaft design, such as including insulating air gaps.

In accordance with this disclosure, a method is provided for controlling lubrication of a rotary shaft seal. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves increasing the rate of heat flow along the rotary shaft to reduce temperature of the film of lubricating oil in the contact zone. Increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

Also, in accordance with this disclosure, a method is provided for controlling heat transfer in a contact zone. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating the contact zone. The contact zone has a film of lubricating oil. The method also involves increasing the rate of heat flow along the rotary shaft to reduce temperature of the film of lubricating oil in the contact zone. Increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

Further, in accordance with this disclosure, a method is provided for improving performance of an apparatus (e.g., rotary machine). The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves increasing the rate of heat flow along the rotary shaft to reduce temperature of the film of lubricating oil in the contact zone. Increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

Still further, in accordance with this disclosure, a method is provided for controlling lubrication of a rotary shaft seal. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves decreasing the rate of heat flow along the rotary shaft to increase temperature of the film of lubricating oil in the contact zone. Decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

Also, in accordance with this disclosure, a method is provided for controlling heat transfer in a contact zone. The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating the contact zone. The contact zone has a film of lubricating oil. The method also involves decreasing the rate of heat flow along the rotary shaft to increase temperature of the film of lubricating oil in the contact zone. Decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

Further, in accordance with this disclosure, a method is provided for improving performance of an apparatus (e.g., rotary machine). The method involves providing an apparatus having a bulk lubricating oil reservoir, a rotary shaft that passes through the bulk lubricating oil reservoir, and a rotary shaft seal. The rotary shaft seal has a sealing edge in proximity with the rotary shaft creating a contact zone. The contact zone has a film of lubricating oil. The method also involves decreasing the rate of heat flow along the rotary shaft to increase temperature of the film of lubricating oil in the contact zone. Decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

In an embodiment, the rate of heat flow along the rotary shaft determines the initial temperature of the film of lubricating oil in the contact zone relative to the temperature of lubricating oil in the bulk lubricating oil reservoir.

In another embodiment, the rate of heat flow along the rotary shaft determines the extent to which friction from the rotary shaft increases the temperature of the film of lubricating oil in the contact zone.

During operation of the apparatus (e.g., rotary machine), the film of lubricating oil in the contact zone is at a reduced or increased temperature compared to the temperature of the lubricating oil in the bulk lubricating oil reservoir.

Controlling heat transfer in the contact zone affords several desired lubricating oil properties including, for example, increasing the rate of heat flow along the rotary shaft to obtain a higher viscosity lubricating oil film in the contact zone, and increasing the rate of heat flow along the rotary shaft to obtain a thicker lubricating oil film in the contact zone.

Controlling heat transfer in the contact zone affords several desired apparatus properties including, for example, decreasing the rate of heat flow along the rotary shaft to obtain reduced friction in the contact zone, thereby improving energy efficiency of the apparatus, and increasing the rate of heat flow along the rotary shaft to reduce thermal stresses on the rotary shaft seal and lubricating oil film, thereby increasing the lifetime of the apparatus.

Illustrative apparatuses (i.e., rotary machines) useful in this disclosure include, for example, gearboxes, pumps, electric motors, hydraulic motors, hydraulic actuators, air compressors, crankshafts, camshafts, and the like. In an embodiment, the rotary shaft is configured to drive an energy-converting device.

In accordance with this disclosure, rotary shaft materials of construction having sufficient high thermal conductivity include, for example, one or more of copper, bronze, aluminum, tungsten, graphite, brass, iron, and the like.

Also, in accordance with this disclosure, rotary shaft materials of construction having sufficient low thermal conductivity include, for example, one or more of stainless steel, metal oxides, glass, silica, polymers, epoxies, rubbers, and the like.

Also, in accordance with this disclosure, rotary shaft coatings having sufficient high thermal conductivities include, for example, one or more of gold, silver, bronze, aluminum, aluminum nitride, zinc, and the like.

Also, in accordance with this disclosure, rotary shaft coatings having sufficient low thermal conductivities include, for example, one or more of metal oxides, glass, silica, polymers, epoxies, rubbers, diamond-like carbon, and the like.

In an embodiment, controlling heat transfer in the contact zone can be accomplished by increasing the surface area of the rotary shaft in order to increase the rate of heat flow along the rotary shaft. This can be accomplished, for example, by adding cooling fins.

In another embodiment, controlling heat transfer in the contact zone can be accomplished by altering the design of the rotary shaft in order to decrease the rate of heat flow along the rotary shaft. This can be accomplished, for example, by including insulating air gaps.

The lubricating oils useful in this disclosure can be selected from a Group I base oil, Group II base oil, Group III base oil, Group IV base oil, Group V base oil, and mixtures thereof, as described herein. The lubricating oil can have one or more additives. The one or more additives can include, for example, an antiwear additive, viscosity modifier, antioxidant, detergent, dispersant, pour point depressant, corrosion inhibitor, metal deactivator, seal compatibility additive, antifoam agent, inhibitor, friction modifier, anti-rust additive, and combinations thereof, as described herein.

Lubricating Oil Base Stocks and Co-Base Stocks

A wide range of lubricating base oils is known in the art. Lubricating base oils that are useful in the present disclosure are natural oils, mineral oils and synthetic oils, and unconventional oils (or mixtures thereof) can be used unrefined, refined, or rerefined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one lubricating oil property. One skilled in the art is familiar with many purification processes. These processes include solvent extraction, secondary distillation, acid extraction, base extraction, filtration, and percolation. Rerefined oils are obtained by processes analogous to refined oils but using an oil that has been previously used as a feed stock.

Groups I, II, III, IV and V are broad base oil stock categories developed and defined by the American Petroleum Institute (API Publication 1509; www.API.org) to create guidelines for lubricant base oils. Group I base stocks have a viscosity index of between about 80 to 120 and contain greater than about 0.03% sulfur and/or less than about 90% saturates. Group II base stocks have a viscosity index of between about 80 to 120, and contain less than or equal to about 0.03% sulfur and greater than or equal to about 90% saturates. Group III stocks have a viscosity index greater than about 120 and contain less than or equal to about 0.03% sulfur and greater than about 90% saturates. Group IV includes polyalphaolefins (PAO). Group V base stock includes base stocks not included in Groups I-IV. The table below summarizes properties of each of these five groups.

| | Base Oil Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | | polyalphaolefins (PAO) | |
| Group V | All other base oil stocks not included in Groups I, II, III or IV | | |

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful. Natural oils vary also as to the method used for their production and purification, for example, their distillation range and whether they are straight run or cracked, hydrorefined, or solvent extracted.

Group II and/or Group III hydroprocessed or hydrocracked base stocks are also well known base stock oils.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$, $C_{10}$, $C_{12}$, $C_{14}$ olefins or mixtures thereof may be utilized. See U.S. Pat. Nos. 4,956,122; 4,827,064; and 4,827,073.

The number average molecular weights of the PAOs, which are known materials and generally available on a major commercial scale from suppliers such as ExxonMobil Chemical Company, Chevron Phillips Chemical Company, BP, and others, typically vary from about 250 to about 3,000, although PAO's may be made in viscosities up to about 150 cSt (100° C.). The PAOs are typically comprised of relatively low molecular weight hydrogenated polymers or oligomers of alphaolefins which include, but are not limited to, $C_2$ to about $C_{32}$ alphaolefins with the $C_8$ to about $C_{16}$ alphaolefins, such as 1-octene, 1-decene, 1-dodecene and the like, being preferred. The preferred polyalphaolefins are poly-1-octene, poly-1-decene and poly-1-dodecene and mixtures thereof and mixed olefin-derived polyolefins. However, the dimers of higher olefins in the range of $C_{12}$ to $C_{18}$ may be used to provide low viscosity base stocks of acceptably low volatility. Depending on the viscosity grade and the starting oligomer, the PAOs may be predominantly dimers, trimers and tetramers of the starting olefins, with minor amounts of the lower and/or higher oligomers, having a viscosity range of 1.5 cSt to 12 cSt. PAO fluids of particular use may include 3 cSt, 3.4 cSt, and/or 3.6 cSt and combinations thereof. Mixtures of PAO fluids having a viscosity range of 1.5 cSt to approximately 150 cSt or more may be used if desired. Unless indicated otherwise, all viscosities cited herein are measured at 100° C.

The PAO fluids may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters such as ethyl acetate or ethyl propionate. For example, the methods disclosed by U.S. Pat. Nos. 4,149,178 or 3,382,291 may be conveniently used herein. Other descriptions of PAO synthesis are found in the following U.S. Pat. Nos. 3,742,082; 3,769,363; 3,876,720; 4,239,930; 4,367,352; 4,413,156; 4,434,408; 4,910,355; 4,956,122; and 5,068,487. The dimers of the $C_{14}$ to $C_{18}$ olefins are described in U.S. Pat. No. 4,218,330.

Other useful lubricant oil base stocks include wax isomerate base stocks and base oils, comprising hydroisomerized waxy stocks (e.g. waxy stocks such as gas oils, slack waxes, fuels hydrocracker bottoms, etc.), hydroisomerized Fischer-Tropsch waxes, Gas-to-Liquids (GTL) base stocks and base oils, and other wax isomerate hydroisomerized base stocks and base oils, or mixtures thereof. Fischer-Tropsch waxes, the high boiling point residues of Fischer-Tropsch synthesis, are highly paraffinic hydrocarbons with very low sulfur content. The hydroprocessing used for the production of such base stocks may use an amorphous hydrocracking/hydroisomerization catalyst, such as one of the specialized lube hydrocracking (LHDC) catalysts or a crystalline hydrocracking/hydroisomerization catalyst, preferably a zeolitic catalyst. For example, one useful catalyst is ZSM-48 as described in U.S. Pat. No. 5,075,269, the disclosure of which is incorporated herein by reference in its entirety. Processes for making hydrocracked/hydroisomerized distillates and hydrocracked/hydroisomerized waxes are described, for example, in U.S. Pat. Nos. 2,817,693; 4,975,177; 4,921,594 and 4,897,178 as well as in British Patent Nos. 1,429,494; 1,350,257; 1,440,230 and 1,390,359. Each of the aforementioned patents is incorporated herein in their entirety. Particularly favorable processes are described in European Patent Application Nos. 464546 and 464547, also incorporated herein by reference. Processes using Fischer-Tropsch wax feeds are described in U.S. Pat. Nos. 4,594,172 and 4,943,672, the disclosures of which are incorporated herein by reference in their entirety.

Gas-to-Liquids (GTL) base oils, Fischer-Tropsch wax derived base oils, and other wax-derived hydroisomerized (wax isomerate) base oils may be advantageously used in the instant disclosure, and may have useful kinematic viscosities at 100° C. of about 2 cSt to about 50 cSt, preferably about 2 cSt to about 30 cSt, more preferably about 3 cSt to about 25 cSt, as exemplified by GTL 4 with kinematic viscosity of about 4.0 cSt at 100° C. and a viscosity index of about 141. These Gas-to-Liquids (GTL) base oils, Fischer-Tropsch wax derived base oils, and other wax-derived hydroisomerized base oils may have useful pour points of about −20° C. or lower, and under some conditions may have advantageous pour points of about −25° C. or lower, with useful pour points of about −30° C. to about −40° C. or lower. Useful compositions of Gas-to-Liquids (GTL) base oils, Fischer-Tropsch wax derived base oils, and wax-derived hydroisomerized base oils are recited in U.S. Pat. Nos. 6,080,301; 6,090,989, and 6,165,949 for example, and are incorporated herein in their entirety by reference.

The hydrocarbyl aromatics can be used as a base oil or base oil component and can be any hydrocarbyl molecule that contains at least about 5% of its weight derived from an aromatic moiety such as a benzenoid moiety or naphthenoid moiety, or their derivatives. These hydrocarbyl aromatics include alkyl benzenes, alkyl naphthalenes, alkyl biphenyls, alkyl diphenyl oxides, alkyl naphthols, alkyl diphenyl sulfides, alkylated bis-phenol A, alkylated thiodiphenol, and the like. The aromatic can be mono-alkylated, dialkylated, poly-alkylated, and the like. The aromatic can be mono- or poly-functionalized. The hydrocarbyl groups can also be comprised of mixtures of alkyl groups, alkenyl groups, alkynyl, cycloalkyl groups, cycloalkenyl groups and other related hydrocarbyl groups. The hydrocarbyl groups can range from about $C_6$ up to about $C_{60}$ with a range of about $C_8$ to about $C_{20}$ often being preferred. A mixture of hydrocarbyl groups is often preferred, and up to about three such substituents may be present. The hydrocarbyl group can optionally contain sulfur, oxygen, and/or nitrogen containing substituents. The aromatic group can also be derived from natural (petroleum) sources, provided at least about 5% of the molecule is comprised of an above-type aromatic moiety. Viscosities at 100° C. of approximately 2 cSt to about 50 cSt are preferred, with viscosities of approximately 3 cSt to about 20 cSt often being more preferred for the hydrocarbyl aromatic component. In one embodiment, an alkyl naphthalene where the alkyl group is primarily comprised of 1-hexadecene is used. Other alkylates of aromatics can be advantageously used. Naphthalene or methyl naphthalene, for example, can be alkylated with olefins such as octene, decene, dodecene, tetradecene or higher, mixtures of similar olefins, and the like. Alkylated naphthalene and analogues may also comprise compositions with isomeric distribution of alkylating groups on the alpha and beta carbon positions of the ring structure. Distribution of groups on the alpha and beta positions of a naphthalene ring may range from 100:1 to 1:100, more often 50:1 to 1:50 Useful concentrations of hydrocarbyl aromatic in a lubricant oil composition can be about 2% to about 50%, preferably about 4% to about 20%, and more preferably about 4% to about 15%, depending on the application.

Alkylated aromatics such as the hydrocarbyl aromatics of the present disclosure may be produced by well-known Friedel-Crafts alkylation of aromatic compounds. See Friedel-Crafts and Related Reactions, Olah, G. A. (ed.), Inter-science Publishers, New York, 1963. For example, an aromatic compound, such as benzene or naphthalene, is alkylated by an olefin, alkyl halide or alcohol in the presence of a Friedel-Crafts catalyst. See Friedel-Crafts and Related Reactions, Vol. 2, part 1, chapters 14, 17, and 18, See Olah, G. A. (ed.), Inter-science Publishers, New York, 1964. Many homogeneous or heterogeneous, solid catalysts are known to one skilled in the art. The choice of catalyst depends on the reactivity of the starting materials and product quality requirements. For example, strong acids such as $AlCl_3$, $BF_3$, or HF may be used. In some cases, milder catalysts such as $FeCl_3$ or $SnCl_4$ are preferred. Newer alkylation technology uses zeolites or solid super acids.

Esters comprise a useful base stock. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc.

Particularly useful synthetic esters are those which are obtained by reacting one or more polyhydric alcohols, preferably the hindered polyols (such as the neopentyl polyols, e.g., neopentyl glycol, trimethylol ethane, 2-methyl-2-propyl-1,3-propanediol, trimethylol propane, pentaerythritol and dipentaerythritol) with alkanoic acids containing at least about 4 carbon atoms, preferably $C_5$ to $C_{30}$ acids such as saturated straight chain fatty acids including caprylic acid, capric acid, lauric acid, myristic acid, palmitic acid, stearic acid, arachic acid, and behenic acid, or the corresponding branched chain fatty acids or unsaturated fatty acids such as oleic acid, or mixtures of any of these materials.

Suitable synthetic ester components include the esters of trimethylol propane, trimethylol butane, trimethylol ethane, pentaerythritol and/or dipentaerythritol with one or more monocarboxylic acids containing from about 5 to about 10 carbon atoms. These esters are widely available commercially, for example, the Mobil A-41 and A-51 esters of ExxonMobil Chemical Company.

Also useful are esters derived from renewable material such as coconut, palm, rapeseed, soy, sunflower and the like. These esters may be monoesters, di-esters, polyol esters, complex esters, or mixtures thereof. These esters are widely available commercially, for example, the EsterexNP 343 ester of ExxonMobil Chemical Company.

Engine oil formulations containing renewable esters are included in this disclosure. For such formulations, the renewable content of the ester is typically greater than about 70 weight percent, preferably more than about 80 weight percent and most preferably more than about 90 weight percent.

Other useful fluids of lubricating viscosity include non-conventional or unconventional base stocks that have been processed, preferably catalytically, or synthesized to provide high performance lubrication characteristics.

Non-conventional or unconventional base stocks/base oils include one or more of a mixture of base stock(s) derived from one or more Gas-to-Liquids (GTL) materials, as well as isomerate/isodewaxate base stock(s) derived from natural wax or waxy feeds, mineral and or non-mineral oil waxy feed stocks such as slack waxes, natural waxes, and waxy stocks such as gas oils, waxy fuels hydrocracker bottoms, waxy raffinate, hydrocrackate, thermal crackates, or other mineral, mineral oil, or even non-petroleum oil derived waxy materials such as waxy materials received from coal liquefaction or shale oil, and mixtures of such base stocks.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL base stocks and/or base oils are GTL materials of lubricating viscosity that are generally derived from hydrocarbons; for example, waxy synthesized hydrocarbons, that are themselves derived from simpler gaseous carbon-containing compounds, hydrogen-containing compounds and/or elements as feed stocks. GTL base stock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized cat and/or solvent dewaxed Fischer-Tropsch (F-T) material (i.e., hydrocarbons, waxy hydrocarbons, waxes and possible analogous oxygenates); preferably hydrodewaxed or hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL base stock(s) and/or base oil(s) derived from GTL materials, especially, hydrodewaxed or hydroisomerized/ followed by cat and/or solvent dewaxed wax or waxy feed, preferably F-T material derived base stock(s) and/or base oil(s), are characterized typically as having kinematic viscosities at 100° C. of from about 2 mm$^2$/s to about 50 mm$^2$/s (ASTM D445). They are further characterized typically as having pour points of −5° C. to about −40° C. or lower (ASTM D97). They are also characterized typically as having viscosity indices of about 80 to about 140 or greater (ASTM D2270).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) typically have very low sulfur and nitrogen content, generally containing less than about 10 ppm, and more typically less than about 5 ppm of each of these elements. The sulfur and nitrogen content of GTL base stock(s) and/or base oil(s) obtained from F-T material, especially F-T wax, is essentially nil. In addition, the absence of phosphorus and aromatics make this materially especially suitable for the formulation of low SAP products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target kinematic viscosity.

The GTL material, from which the GTL base stock(s) and/or base oil(s) is/are derived is preferably an F-T material (i.e., hydrocarbons, waxy hydrocarbons, wax).

Base oils for use in the formulated lubricating oils useful in the present disclosure are any of the variety of oils corresponding to API Group I, Group II, Group III, Group IV, and Group V oils and mixtures thereof, preferably API Group II, Group III, Group IV, and Group V oils and mixtures thereof, more preferably the Group III to Group V base oils due to their exceptional volatility, stability, viscometric and cleanliness features. Minor quantities of Group I stock, such as the amount used to dilute additives for blending into formulated lube oil products, can be tolerated but should be kept to a minimum, i.e. amounts only associated with their use as diluent/carrier oil for additives used on an "as-received" basis. Even in regard to the Group II stocks, it is preferred that the Group II stock be in the higher quality range associated with that stock, i.e. a Group II stock having a viscosity index in the range 100<VI<120.

The base oil constitutes the major component of the engine oil lubricant composition of the present disclosure and typically is present in an amount ranging from about 6 to about 99 weight percent or from about 6 to about 95 weight percent, preferably from about 50 to about 99 weight percent or from about 70 to about 95 weight percent, and more preferably from about 85 to about 95 weight percent, based on the total weight of the composition. The base oil may be selected from any of the synthetic or natural oils typically used as crankcase lubricating oils for spark-ignited and compression-ignited engines. The base oil conveniently has a kinematic viscosity, according to ASTM standards, of about 2.5 cSt to about 18 cSt (or mm$^2$/s) at 100° C. and preferably of about 2.5 cSt to about 12.5 cSt (or mm$^2$/s) at 100° C., often more preferably from about 2.5 cSt to about 10 cSt. Mixtures of synthetic and natural base oils may be used if desired. Bi-modal, tri-modal, and additional combinations of mixtures of Group I, II, III, IV, and/or V base stocks may be used if desired.

The co-base stock component is present in an amount sufficient for providing solubility, compatibility and dispersancy of polar additives in the lubricating oil. The co-base stock component is present in the lubricating oils of this disclosure in an amount from about 1 to about 99 weight percent, preferably from about 5 to about 95 weight percent, and more preferably from about 10 to about 90 weight percent.

Lubricating Oil Additives

The formulated lubricating oil useful in the present disclosure may additionally contain one or more of the commonly used lubricating oil performance additives including but not limited to antiwear additives, dispersants, detergents, viscosity modifiers, corrosion inhibitors, rust inhibitors, metal deactivators, extreme pressure additives, anti-seizure agents, wax modifiers, viscosity modifiers, fluid-loss additives, seal compatibility agents, lubricity agents, anti-staining agents, chromophoric agents, defoamants, demulsifiers, densifiers, wetting agents, gelling agents, tackiness agents, colorants, metal passivators, and others. For a review of many commonly used additives, see Klamann in Lubricants and Related Products, Verlag Chemie, Deerfield Beach, FL; ISBN 0-89573-177-0. Reference is also made to "Lubricant Additives" by M. W. Ranney, published by Noyes Data Corporation of Parkridge, NJ (1973); see also U.S. Pat. No. 7,704,930, the disclosure of which is incorporated herein in its entirety. These additives are commonly delivered with varying amounts of diluent oil, that may range from 5 weight percent to 50 weight percent.

The additives useful in this disclosure do not have to be soluble in the lubricating oils. Insoluble additives in oil can be dispersed in the lubricating oils of this disclosure.

The types and quantities of performance additives used in combination with the instant disclosure in lubricant compositions are not limited by the examples shown herein as illustrations.

Antiwear Additives

A metal alkylthiophosphate and more particularly a metal dialkyl dithio phosphate in which the metal constituent is zinc, or zinc dialkyl dithio phosphate (ZDDP) can be a useful component of the lubricating oils of this disclosure. ZDDP can be derived from primary alcohols, secondary alcohols or mixtures thereof. ZDDP compounds generally are of the formula

$$Zn[SP(S)(OR^1)(OR^2)]_2$$

where $R^1$ and $R^2$ are $C_1$-$C_{18}$ alkyl groups, preferably $C_2$-$C_{12}$ alkyl groups. These alkyl groups may be straight chain or branched. Alcohols used in the ZDDP can be propanol, 2-propanol, butanol, secondary butanol, pentanols, hexanols such as 4-methyl-2-pentanol, n-hexanol, n-octanol, 2-ethyl hexanol, alkylated phenols, and the like. Mixtures of secondary alcohols or of primary and secondary alcohol can be preferred. Alkyl aryl groups may also be used.

Preferable zinc dithiophosphates which are commercially available include secondary zinc dithiophosphates such as those available from for example. The Lubrizol Corporation under the trade designations "LZ 677A", "LZ 1095" and "LZ 1371", from for example Chevron Oronite under the trade designation "OLOA 262" and from for example Afton Chemical under the trade designation "HITEC 7169".

The ZDDP is typically used in amounts of from about 0.3 weight percent to about 1.5 weight percent, preferably from about 0.4 weight percent to about 1.2 weight percent, more preferably from about 0.5 weight percent to about 1.0 weight percent, and even more preferably from about 0.6 weight percent to about 0.8 weight percent, based on the total weight of the lubricating oil, although more or less can often be used advantageously. Preferably, the ZDDP is a secondary ZDDP and present in an amount of from about 0.6 to 1.0 weight percent of the total weight of the lubricating oil.

Dispersants

During engine operation, oil-insoluble oxidation byproducts are produced. Dispersants help keep these byproducts in solution, thus diminishing their deposition on metal surfaces. Dispersants used in the formulation of the lubricating oil may be ashless or ash-forming in nature. Preferably, the dispersant is ashless. So called ashless dispersants are organic materials that form substantially no ash upon combustion. For example, non-metal-containing dispersants are considered ashless. In contrast, metal-containing detergents discussed above form ash upon combustion.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

Illustrative dispersants useful in this disclosure include, for example, (poly)alkenylsuccinic derivatives, polyisobutylene succinimide (PIBSA) having a basic nitrogen content of about 1% or greater, succinimides, hydrocarbyl-substituted succinic acids, hydrocarbyl-substituted succinic anhydride derivatives, or mixtures thereof, all having a basic nitrogen content of about 1% or greater.

A useful class of dispersants are the (poly)alkenylsuccinic derivatives, typically produced by the reaction of a long chain hydrocarbyl substituted succinic compound, usually a hydrocarbyl substituted succinic anhydride, with a polyhydroxy or polyamino compound. The long chain hydrocarbyl group constituting the oleophilic portion of the molecule which confers solubility in the oil, is normally a polyisobutylene group. Many examples of this type of dispersant are well known commercially and in the literature. Exemplary U.S. patents describing such dispersants are U.S. Pat. Nos. 3,172,892; 3,2145,707; 3,219,666; 3,316,177; 3,341,542; 3,444,170; 3,454,607; 3,541,012; 3,630,904; 3,632,511; 3,787,374 and 4,234,435. Other types of dispersant are described in U.S. Pat. Nos. 3,036,003; 3,200,107; 3,254,025; 3,275,554; 3,438,757; 3,454,555; 3,565,804; 3,413,347; 3,697,574; 3,725,277; 3,725,480; 3,726,882; 4,454,059; 3,329,658; 3,449,250; 3,519,565; 3,666,730; 3,687,849; 3,702,300; 4,100,082; 5,705,458. A further description of dispersants may be found, for example, in European Patent Application No. 471 071, to which reference is made for this purpose.

Hydrocarbyl-substituted succinic acid and hydrocarbyl-substituted succinic anhydride derivatives are useful dispersants. In particular, succinimide, succinate esters, or succinate ester amides prepared by the reaction of a hydrocarbon-substituted succinic acid compound preferably having at least 50 carbon atoms in the hydrocarbon substituent, with at least one equivalent of an alkylene amine are particularly useful.

Succinimides are formed by the condensation reaction between hydrocarbyl substituted succinic anhydrides and amines Molar ratios can vary depending on the polyamine. For example, the molar ratio of hydrocarbyl substituted succinic anhydride to TEPA can vary from about 1:1 to about 5:1. Representative examples are shown in U.S. Pat. Nos. 3,087,936; 3,172,892; 3,219,666; 3,272,746; 3,322,670; and 3,652,616, 3,948,800; and Canada Patent No. 1,094,044.

Succinate esters are formed by the condensation reaction between hydrocarbyl substituted succinic anhydrides and alcohols or polyols. Molar ratios can vary depending on the alcohol or polyol used. For example, the condensation product of a hydrocarbyl substituted succinic anhydride and pentaerythritol is a useful dispersant.

Succinate ester amides are formed by condensation reaction between hydrocarbyl substituted succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine. Representative examples are shown in U.S. Pat. No. 4,426,305.

The molecular weight of the hydrocarbyl substituted succinic anhydrides used in the preceding paragraphs will typically range between 800 and 2,500 or more. The above products can be post-reacted with various reagents such as sulfur, oxygen, formaldehyde, carboxylic acids such as oleic acid. The above products can also be post reacted with boron compounds such as boric acid, borate esters or highly borated dispersants, to form borated dispersants generally having from about 0.1 to about 5 moles of boron per mole of dispersant reaction product.

Suitable dispersants include succinimides, including those derivatives from mono-succinimides, bis-succinimides, and/or mixtures of mono- and bis-succinimides, wherein the hydrocarbyl succinimide is derived from a hydrocarbylene group such as polyisobutylene having a Mn of from about 500 to about 5000, or from about 1000 to about 3000, or about 1000 to about 2000, or a mixture of such hydrocarbylene groups, often with high terminal vinylic groups. Other preferred dispersants include succinic acid-esters and amides, alkylphenol-polyamine-coupled Mannich adducts, their capped derivatives, and other related components.

Illustrative dispersants useful in this disclosure include those derived from polyalkenyl-substituted mono- or dicarboxylic acid, anhydride or ester, which dispersant has a polyalkenyl moiety with a number average molecular weight of at least 900 and from greater than 1.3 to 1.7, preferably from greater than 1.3 to 1.6, most preferably from greater than 1.3 to 1.5, functional groups (mono- or dicarboxylic acid producing moieties) per polyalkenyl moiety (a medium functionality dispersant). Functionality (F) can be determined according to the following formula:

$$F=(SAP \times M_n)/((112{,}200 \times A.I.)-(SAP \times 98))$$

wherein SAP is the saponification number (i.e., the number of milligrams of KOH consumed in the complete neutralization of the acid groups in one gram of the succinic-containing reaction product, as determined according to ASTM D94); $M_n$ is the number average molecular weight of the starting olefin polymer; and A.I. is the percent active ingredient of the succinic-containing reaction product (the remainder being unreacted olefin polymer, succinic anhydride and diluent).

The polyalkenyl moiety of the dispersant may have a number average molecular weight of at least 900, suitably at least 1500, preferably between 1800 and 3000, such as between 2000 and 2800, more preferably from about 2100 to 2500, and most preferably from about 2200 to about 2400. The molecular weight of a dispersant is generally expressed in terms of the molecular weight of the polyalkenyl moiety. This is because the precise molecular weight range of the dispersant depends on numerous parameters including the type of polymer used to derive the dispersant, the number of functional groups, and the type of nucleophilic group employed.

Polymer molecular weight, specifically $M_n$, can be determined by various known techniques. One convenient method is gel permeation chromatography (GPC), which additionally provides molecular weight distribution information (see W. W. Yau, J. J. Kirkland and D. D. Bly, "Modern Size Exclusion Liquid Chromatography", John Wiley and Sons, New York, 1979). Another useful method for determining molecular weight, particularly for lower molecular weight polymers, is vapor pressure osmometry (e.g., ASTM D3592).

The polyalkenyl moiety in a dispersant preferably has a narrow molecular weight distribution (MWD), also referred to as polydispersity, as determined by the ratio of weight average molecular weight ($M_w$) to number average molecular weight ($M_n$). Polymers having a $M_w/M_n$ of less than 2.2, preferably less than 2.0, are most desirable. Suitable polymers have a polydispersity of from about 1.5 to 2.1, preferably from about 1.6 to about 1.8.

Suitable polyalkenes employed in the formation of the dispersants include homopolymers, interpolymers or lower molecular weight hydrocarbons. One family of such polymers comprise polymers of ethylene and/or at least one $C_3$ to $C_2$ alpha-olefin having the formula $H_2C=CHR^1$ wherein $R^1$ is a straight or branched chain alkyl radical comprising 1 to 26 carbon atoms and wherein the polymer contains carbon-to-carbon unsaturation, and a high degree of terminal ethenylidene unsaturation. Preferably, such polymers comprise interpolymers of ethylene and at least one alpha-olefin of the above formula, wherein $R^1$ is alkyl of from 1 to 18 carbon atoms, and more preferably is alkyl of from 1 to 8 carbon atoms, and more preferably still of from 1 to 2 carbon atoms.

Another useful class of polymers is polymers prepared by cationic polymerization of monomers such as isobutene and styrene. Common polymers from this class include polyisobutenes obtained by polymerization of a $C_4$ refinery stream having a butene content of 35 to 75% by weight, and an isobutene content of 30 to 60% by weight. A preferred source of monomer for making poly-n-butenes is petroleum feedstreams such as Raffinate II. These feedstocks are disclosed in the art such as in U.S. Pat. No. 4,952,739. A preferred embodiment utilizes polyisobutylene prepared from a pure isobutylene stream or a Raffinate I stream to prepare reactive isobutylene polymers with terminal vinylidene olefins. Polyisobutene polymers that may be employed are generally based on a polymer chain of from 1500 to 3000.

The dispersant(s) are preferably non-polymeric (e.g., mono- or bis-succinimides). Such dispersants can be prepared by conventional processes such as disclosed in U.S. Patent Application Publication No. 2008/0020950, the disclosure of which is incorporated herein by reference.

Other suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

Mannich base dispersants are made from the reaction of alkylphenols, formaldehyde, and amines See U.S. Pat. No. 4,767,551, which is incorporated herein by reference. Process aids and catalysts, such as oleic acid and sulfonic acids, can also be part of the reaction mixture. Molecular weights of the alkylphenols range from 800 to 2,500. Representative examples are shown in U.S. Pat. Nos. 3,697,574; 3,703,536; 3,704,308; 3,751,365; 3,756,953; 3,798,165; and 3,803,039.

Typical high molecular weight aliphatic acid modified Mannich condensation products useful in this disclosure can be prepared from high molecular weight alkyl-substituted hydroxyaromatics or $HNR_2$ group-containing reactants.

Hydrocarbyl substituted amine ashless dispersant additives are well known to one skilled in the art; see, for example, U.S. Pat. Nos. 3,275,554; 3,438,757; 3,565,804; 3,755,433, 3,822,209, and 5,084,197.

Polymethacrylate or polyacrylate derivatives are another class of dispersants. These dispersants are typically prepared by reacting a nitrogen containing monomer and a methacrylic or acrylic acid esters containing 5-25 carbon atoms in the ester group. Representative examples are shown in U.S. Pat. Nos. 2,100,993, and 6,323,164. Polymethacrylate and polyacrylate dispersants are normally used as multifunctional viscosity modifiers. The lower molecular weight versions can be used as lubricant dispersants or fuel detergents.

The dispersant(s) can be borated by conventional means, as generally disclosed in U.S. Pat. Nos. 3,087,936, 3,254,025 and 5,430,105.

Such dispersants may be used in an amount of about 0.001 to 20 weight percent or 0.01 to 10 weight percent, preferably about 0.5 to 8 weight percent, or more preferably 0.5 to 4 weight percent. Or such dispersants may be used in an amount of about 2 to 12 weight percent, preferably about 4 to 10 weight percent, or more preferably 6 to 9 weight percent. On an active ingredient basis, such additives may be used in an amount of about 0.06 to 14 weight percent, preferably about 0.3 to 6 weight percent.

As used herein, the dispersant concentrations are given on an "as delivered" basis. Typically, the active dispersant is delivered with a process oil. The "as delivered" dispersant typically contains from about 20 weight percent to about 80 weight percent, or from about 40 weight percent to about 60 weight percent, of active dispersant in the "as delivered" dispersant product.

Detergents

Illustrative detergents (e.g., non-borated) useful in this disclosure include, for example, alkali metal detergents, alkaline earth metal detergents, or mixtures of one or more alkali metal detergents and one or more alkaline earth metal detergents. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur-containing acid, carboxylic acid (e.g., salicylic acid), phosphorus-containing acid, phenol, or mixtures thereof. The counterion is typically an alkaline earth or alkali metal. The detergent can be overbased. Non-borated or borated detergents can be used.

The detergent can be a metal salt of an organic or inorganic acid, a metal salt of a phenol, or mixtures thereof. The metal can be an alkali metal, an alkaline earth metal, and mixtures thereof. The organic or inorganic acid is selected from an aliphatic organic or inorganic acid, a cycloaliphatic organic or inorganic acid, an aromatic organic or inorganic acid, and mixtures thereof.

The metal can be an alkali metal, an alkaline earth metal, and mixtures thereof. Particularly, the metal can be calcium (Ca), magnesium (Mg), and mixtures thereof.

The organic acid or inorganic acid can be a sulfur-containing acid, a carboxylic acid, a phosphorus-containing acid, and mixtures thereof.

In an embodiment, the metal salt of an organic or inorganic acid or the metal salt of a phenol can be calcium phenate, magnesium phenate, an overbased detergent, and mixtures thereof.

Salts that contain a substantially stochiometric amount of the metal are described as neutral salts and have a total base number (TBN, as measured by ASTM D2896) of from 0 to 80. Many compositions are overbased, containing large amounts of a metal base that is achieved by reacting an excess of a metal compound (a metal hydroxide or oxide, for example) with an acidic gas (such as carbon dioxide). Useful detergents can be neutral, mildly overbased, or highly overbased. These detergents can be used in mixtures of neutral, overbased, highly overbased calcium phenates and/or magnesium phenates. The TBN ranges can vary from low, medium to high TBN products, including as low as 0 to as high as 600. The TBN delivered by the detergent is between 1 and 20. The TBN delivered by the detergent can be between 1 and 12. Mixtures of low, medium, high TBN can be used, along with mixtures of calcium and magnesium metal based detergents, and including phenates and carboxylates. A detergent mixture with a metal ratio of 1, in conjunction of a detergent with a metal ratio of 2, and as high as a detergent with a metal ratio of 5, can be used. Non-borated or borated detergents can be used.

Alkaline earth phenates are another useful class of detergent. These detergents can be made by reacting alkaline earth metal hydroxide or oxide (CaO, Ca(OH)$_2$, BaO, Ba(OH)$_2$, MgO, Mg(OH)$_2$, for example) with an alkyl phenol or sulfurized alkylphenol. Useful alkyl groups include straight chain or branched $C_1$-$C_{30}$ alkyl groups, particularly, $C_4$-$C_{20}$ or mixtures thereof. Examples of suitable phenols include isobutylphenol, 2-ethylhexylphenol, nonylphenol, dodecyl phenol, and the like. It should be noted that starting alkylphenols may contain more than one alkyl substituent that are each independently straight chain or branched and can be used from 0.5 to 6 weight percent. When a non-sulfurized alkylphenol is used, the sulfurized product may be obtained by methods well known in the art. These methods include heating a mixture of alkylphenol and sulfurizing agent (including elemental sulfur, sulfur halides such as sulfur dichloride, and the like) and then reacting the sulfurized phenol with an alkaline earth metal base.

Alkaline earth metal phosphates are also used as detergents and are known in the art.

Detergents may be simple detergents or what is known as hybrid or complex detergents. The latter detergents can provide the properties of two detergents without the need to blend separate materials. See U.S. Pat. No. 6,034,039.

Illustrative detergents include calcium phenates, magnesium phenates, and other related components (including borated detergents), and mixtures thereof. Illustrative mixtures of detergents include calcium phenate and magnesium phenate. Overbased detergents are also used. One example of a borated calcium sulfonate detergent is OLOA 10400X.

The detergent concentration in the lubricating oils of this disclosure can range from about 0.5 to about 6.0 weight percent, preferably about 0.6 to 5.0 weight percent, and more preferably from about 0.8 weight percent to about 4.0 weight percent, based on the total weight of the lubricating oil. For lower soap concentrations, the detergent concentration in the lubricating oils of this disclosure can range from about 0.5 to about 6.0 weight percent, preferably about 1.0 to 3.0 weight percent, and more preferably from about 1.5 weight percent to about 2.5 weight percent, based on the total weight of the lubricating oil. For higher soap concentrations, the detergent concentration in the lubricating oils of this disclosure can range from about 0.5 to about 6.0 weight percent, preferably about 1.0 to 5.5 weight percent, and more preferably from about 3.0 weight percent to about 4.0 weight percent, based on the total weight of the lubricating oil.

As used herein, the detergent concentrations are given on an "as delivered" basis. Typically, the active detergent is delivered with a process oil. The "as delivered" detergent typically contains from about 20 weight percent to about 100 weight percent, or from about 40 weight percent to about 60 weight percent, of active detergent in the "as delivered" detergent product.

Viscosity Modifiers

Viscosity modifiers (also known as viscosity index improvers (VI improvers), and viscosity improvers) can be included in the lubricant compositions of this disclosure.

Viscosity modifiers provide lubricants with high and low temperature operability. These additives impart shear stability at elevated temperatures and acceptable viscosity at low temperatures.

Suitable viscosity modifiers include high molecular weight hydrocarbons, polyesters and viscosity modifier dispersants that function as both a viscosity modifier and a dispersant. Typical molecular weights of these polymers are between about 10,000 to 1,500,000, more typically about 20,000 to 1,200,000, and even more typically between about 50,000 and 1,000,000.

Examples of suitable viscosity modifiers are linear or star-shaped polymers and copolymers of methacrylate, butadiene, olefins, or alkylated styrenes. Polyisobutylene is a commonly used viscosity modifier. Another suitable viscosity modifier is polymethacrylate (copolymers of various chain length alkyl methacrylates, for example), some formulations of which also serve as pour point depressants. Other suitable viscosity modifiers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

Olefin copolymers are commercially available from Chevron Oronite Company LLC under the trade designation "PARATONE®" (such as "PARATONE® 8921" and "PARATONE® 8941"); from Afton Chemical Corporation under the trade designation "HiTEC®" (such as "HiTEC® 5850B"; and from The Lubrizol Corporation under the trade designation "Lubrizol® 7067C". Hydrogenated polyisoprene star polymers are commercially available from Infineum International Limited, e.g., under the trade designation "SV200" and "SV600". Hydrogenated diene-styrene block copolymers are commercially available from Infineum International Limited, e.g., under the trade designation "SV 50".

The polymethacrylate or polyacrylate polymers can be linear polymers which are available from Evnoik Industries under the trade designation "Viscoplex®" (e.g., Viscoplex 6-954) or star polymers which are available from Lubrizol Corporation under the trade designation Asteric™ (e.g., Lubrizol 87708 and Lubrizol 87725).

Illustrative vinyl aromatic-containing polymers useful in this disclosure may be derived predominantly from vinyl aromatic hydrocarbon monomer. Illustrative vinyl aromatic-containing copolymers useful in this disclosure may be represented by the following general formula:

A-B wherein A is a polymeric block derived predominantly from vinyl aromatic hydrocarbon monomer, and B is a polymeric block derived predominantly from conjugated diene monomer.

In an embodiment of this disclosure, the viscosity modifiers may be used in an amount of less than about 10 weight percent, preferably less than about 7 weight percent, more preferably less than about 4 weight percent, and in certain instances, may be used at less than 2 weight percent, preferably less than about 1 weight percent, and more preferably less than about 0.5 weight percent, based on the total weight of the formulated oil or lubricating engine oil. Viscosity modifiers are typically added as concentrates, in large amounts of diluent oil.

As used herein, the viscosity modifier concentrations are given on an "as delivered" basis. Typically, the active polymer is delivered with a diluent oil. The "as delivered" viscosity modifier typically contains from 20 weight percent to 75 weight percent of an active polymer for polymethacrylate or polyacrylate polymers, or from 8 weight percent to 20 weight percent of an active polymer for olefin copolymers, hydrogenated polyisoprene star polymers, or hydrogenated diene-styrene block copolymers, in the "as delivered" polymer concentrate.

Antioxidants

Antioxidants retard the oxidative degradation of base oils during service. Such degradation may result in deposits on metal surfaces, the presence of sludge, or a viscosity increase in the lubricant. One skilled in the art knows a wide variety of oxidation inhibitors that are useful in lubricating oil compositions. See, Klamann in Lubricants and Related Products, op cite, and U.S. Pat. Nos. 4,798,684 and 5,084,197, for example.

Useful antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_6+$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic proprionic ester derivatives. Bis-phenolic antioxidants may also be advantageously used in combination with the instant disclosure. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Effective amounts of one or more catalytic antioxidants may also be used. The catalytic antioxidants comprise an effective amount of a) one or more oil soluble polymetal organic compounds; and, effective amounts of b) one or more substituted N,N'-diaryl-o-phenylenediamine compounds or c) one or more hindered phenol compounds; or a combination of both b) and c). Catalytic antioxidants are more fully described in U.S. Pat. No. 8,048,833, herein incorporated by reference in its entirety.

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic monoamines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to about 20 carbon atoms, and preferably contains from about 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines, phenyl naphthylamines, phenothiazines, imidodibenzyls and diphenyl phenylene diamines Mixtures of two or more aromatic amines are also useful. Polymeric amine antioxidants can also be used. Particular examples of aromatic amine antioxidants useful in the present disclosure include: p,p'-dioctyldiphenylamine; t-octylphenyl-alpha-naphthylamine; phenyl-alphanaphthylamine; and p-octylphenyl-alpha-naphthylamine.

Sulfurized alkyl phenols and alkali or alkaline earth metal salts thereof also are useful antioxidants.

Preferred antioxidants include hindered phenols, arylamines. These antioxidants may be used individually by type or in combination with one another. Such additives may be used in an amount of about 0.01 to 5 weight percent, preferably about 0.01 to 1.5 weight percent, more preferably zero to less than 1.5 weight percent, more preferably zero to less than 1 weight percent.

Pour Point Depressants (PPDs)

Conventional pour point depressants (also known as lube oil flow improvers) may be added to the compositions of the present disclosure if desired. These pour point depressant may be added to lubricating compositions of the present disclosure to lower the minimum temperature at which the fluid will flow or can be poured. Examples of suitable pour point depressants include polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. U.S. Pat. Nos. 1,815,022; 2,015,748; 2,191,498; 2,387,501; 2,655, 479; 2,666,746; 2,721,877; 2,721,878; and 3,250,715 describe useful pour point depressants and/or the preparation thereof. Such additives may be used in an amount of about 0.01 to 5 weight percent, preferably about 0.01 to 1.5 weight percent.

Seal Compatibility Agents

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride. Such additives may be used in an amount of about 0.01 to 3 weight percent, preferably about 0.01 to 2 weight percent.

Antifoam Agents

Anti-foam agents may advantageously be added to lubricant compositions. These agents retard the formation of stable foams. Silicones and organic polymers are typical anti-foam agents. For example, polysiloxanes, such as silicon oil or polydimethyl siloxane, provide antifoam properties. Anti-foam agents are commercially available and may be used in conventional minor amounts along with other additives such as demulsifiers; usually the amount of these additives combined is less than 1 weight percent and often less than 0.1 weight percent.

Inhibitors and Antirust Additives

Antirust additives (or corrosion inhibitors) are additives that protect lubricated metal surfaces against chemical attack by water or other contaminants. A wide variety of these are commercially available.

One type of antirust additive is a polar compound that wets the metal surface preferentially, protecting it with a film of oil. Another type of antirust additive absorbs water by incorporating it in a water-in-oil emulsion so that only the oil touches the metal surface. Yet another type of antirust additive chemically adheres to the metal to produce a non-reactive surface. Examples of suitable additives include zinc dithiophosphates, metal phenolates, basic metal sulfonates, fatty acids and amines Such additives may be used in an amount of about 0.01 to 5 weight percent, preferably about 0.01 to 1.5 weight percent.

Friction Modifiers

A friction modifier is any material or materials that can alter the coefficient of friction of a surface lubricated by any lubricant or fluid containing such material(s). Friction modifiers, also known as friction reducers, or lubricity agents or oiliness agents, and other such agents that change the ability of base oils, formulated lubricant compositions, or functional fluids, to modify the coefficient of friction of a lubricated surface may be effectively used in combination with the base oils or lubricant compositions of the present disclosure if desired. Friction modifiers that lower the coefficient of friction are particularly advantageous in combination with the base oils and lube compositions of this disclosure.

Illustrative friction modifiers may include, for example, organometallic compounds or materials, or mixtures thereof. Illustrative organometallic friction modifiers useful in the lubricating engine oil formulations of this disclosure include, for example, molybdenum amine, molybdenum diamine, an organotungstenate, a molybdenum dithiocarbamate, molybdenum dithiophosphates, molybdenum amine complexes, molybdenum carboxylates, and the like, and mixtures thereof. Similar tungsten based compounds may be preferable.

Other illustrative friction modifiers useful in the lubricating engine oil formulations of this disclosure include, for example, alkoxylated fatty acid esters, alkanolamides, polyol fatty acid esters, borated glycerol fatty acid esters, fatty alcohol ethers, and mixtures thereof.

Illustrative alkoxylated fatty acid esters include, for example, polyoxyethylene stearate, fatty acid polyglycol ester, and the like. These can include polyoxypropylene stearate, polyoxybutylene stearate, polyoxyethylene isostearate, polyoxypropylene isostearate, polyoxyethylene palmitate, and the like.

Illustrative alkanolamides include, for example, lauric acid diethylalkanolamide, palmic acid diethylalkanolamide, and the like. These can include oleic acid diethyalkanolamide, stearic acid diethylalkanolamide, oleic acid diethylalkanolamide, polyethoxylated hydrocarbylamides, polypropoxylated hydrocarbylamides, and the like.

Illustrative polyol fatty acid esters include, for example, glycerol mono-oleate, saturated mono-, di-, and tri-glyceride esters, glycerol mono-stearate, and the like. These can include polyol esters, hydroxyl-containing polyol esters, and the like.

Illustrative borated glycerol fatty acid esters include, for example, borated glycerol mono-oleate, borated saturated mono-, di-, and tri-glyceride esters, borated glycerol monosterate, and the like. In addition to glycerol polyols, these can include trimethylolpropane, pentaerythritol, sorbitan, and the like. These esters can be polyol monocarboxylate esters, polyol dicarboxylate esters, and on occasion polyoltricarboxylate esters. Preferred can be the glycerol monooleates, glycerol dioleates, glycerol trioleates, glycerol monostearates, glycerol distearates, and glycerol tristearates and the corresponding glycerol monopalmitates, glycerol dipalmitates, and glycerol tripalmitates, and the respective isostearates, linoleates, and the like. On occasion the glycerol esters can be preferred as well as mixtures containing any of these. Ethoxylated, propoxylated, butoxylated fatty acid esters of polyols, especially using glycerol as underlying polyol can be preferred.

Illustrative fatty alcohol ethers include, for example, stearyl ether, myristyl ether, and the like. Alcohols, including those that have carbon numbers from $C_3$ to $C_{50}$, can be ethoxylated, propoxylated, or butoxylated to form the corresponding fatty alkyl ethers. The underlying alcohol portion can preferably be stearyl, myristyl, $C_{11}$-$C_{13}$ hydrocarbon, oleyl, isosteryl, and the like.

The lubricating oils of this disclosure exhibit desired properties, e.g., wear control, in the presence or absence of a friction modifier.

Useful concentrations of friction modifiers may range from 0.01 weight percent to 5 weight percent, or about 0.1 weight percent to about 2.5 weight percent, or about 0.1 weight percent to about 1.5 weight percent, or about 0.1 weight percent to about 1 weight percent. Concentrations of molybdenum-containing materials are often described in terms of Mo metal concentration. Advantageous concentrations of Mo may range from 25 ppm to 700 ppm or more, and often with a preferred range of 50-200 ppm. Friction modifiers of all types may be used alone or in mixtures with the materials of this disclosure. Often mixtures of two or more friction modifiers, or mixtures of friction modifier(s) with alternate surface active material(s), are also desirable.

When lubricating oil compositions contain one or more of the additives discussed above, the additive(s) are blended into the composition in an amount sufficient for it to perform its intended function. Typical amounts of such additives useful in the present disclosure are shown in Table 1 below.

It is noted that many of the additives are shipped from the additive manufacturer as a concentrate, containing one or more additives together, with a certain amount of base oil diluents. Accordingly, the weight amounts in the table below, as well as other amounts mentioned herein, are directed to the amount of active ingredient (that is the non-diluent portion of the ingredient). The weight percent (wt. %) indicated below is based on the total weight of the lubricating oil composition.

TABLE 1

Typical Amounts of Lubricating Oil Components

| Compound | Approximate Wt. % (Useful) | Approximate Wt. % (Preferred) |
|---|---|---|
| Dispersant | 0.1-20 | 0.1-8 |
| Detergent | 0.1-20 | 0.1-8 |
| Friction Modifier | 0.01-5 | 0.01-1.5 |
| Antioxidant | 0.1-8 | 0.1-3 |

TABLE 1-continued

Typical Amounts of Lubricating Oil Components

| Compound | Approximate Wt. % (Useful) | Approximate Wt. % (Preferred) |
|---|---|---|
| Pour Point Depressant (PPD) | 0.0-5 | 0.01-1.5 |
| Antifoam Agent | 0.001-3 | 0.001-0.2 |
| Viscosity Modifier (solid polymer basis) | 0.1-2 | 0.1-1 |
| Antiwear | 0.2-3 | 0.5-1 |
| Inhibitor and Antirust | 0.01-5 | 0.01-1.5 |

The foregoing additives are all commercially available materials. These additives may be added independently but are usually precombined in packages which can be obtained from suppliers of lubricant oil additives. Additive packages with a variety of ingredients, proportions and characteristics are available and selection of the appropriate package will take the requisite use of the ultimate composition into account.

The lubricating oils of this disclosure have utility in automotive, commercial, and industrial applications.

The following non-limiting examples are provided to illustrate the disclosure.

EXAMPLES

All of the ingredients used herein are commercially available. The additive package used herein is commercially available from Afton Chemical. Lubricating oil formulations were prepared as described herein.

The additive package used in the formulations included conventional additives in conventional amounts. Additives used in the formulations were one or more of an antioxidant, dispersant, ashless antiwear agent, extreme pressure agent, and metal (molybdenum). Optional additives were one or more of a corrosion inhibitor, metal passivator, pour point depressant, metal deactivator, seal compatibility additive, antifoam agent, and friction modifier.

Figure 3:
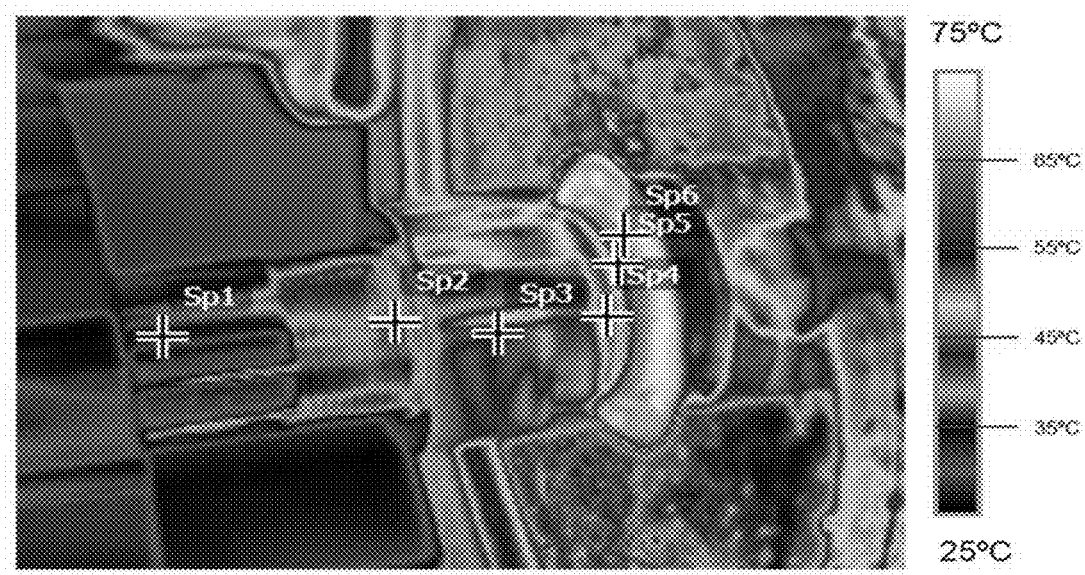
FIG. 3 depicts thermographs showing that the sealing zone is at a temperature of approximately 70° C., and that the temperature decreases with increasing distance from the sealing zone, in accordance with the Examples.

It has been found that the lubricated contact zone is at a lower temperature than the bulk oil reservoir. The thermographs in FIG. 3 show an oil reservoir with a bulk temperature of 80° C. The thermographs indicate that the sealing zone is at a temperature of approximately 70° C., and is consistent with predictions based on heat flow calculations. This confirms that heat flow through the rotary shaft is important is establishing the temperature of the lubricated seal.

FIG. 1 shows a rotary shaft seal that is used to seal fluids in a reservoir around a rotating shaft.

Figure 2:
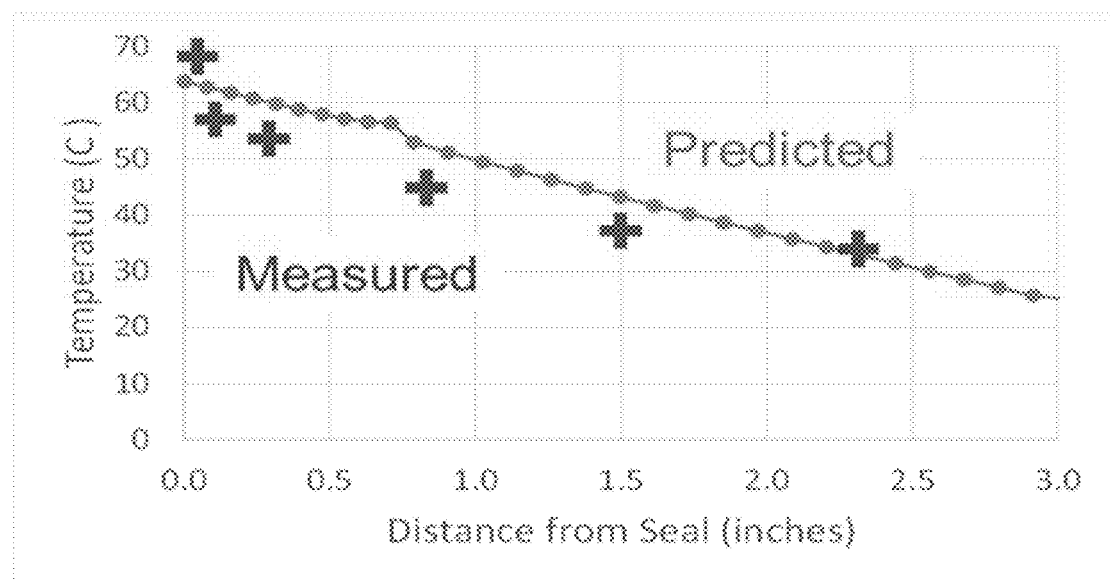
FIG. 2 graphically plots temperature readings from the thermographs in FIG. 3 showing that the sealing zone is at a temperature of approximately 70° C., and that the temperature decreases with increasing distance from the sealing zone, in accordance with the Examples.

FIG. 2 graphically plots temperature readings from the thermographs in FIG. 3 showing that the sealing zone is at a temperature of approximately 70° C., and that the temperature decreases with increasing distance from the sealing zone.

FIG. 3 depicts thermographs showing that the sealing zone is at a temperature of approximately 70° C., and that the temperature decreases with increasing distance from the sealing zone.

PCT and EP Clauses:

1. A method for controlling lubrication of a rotary shaft seal, said method comprising:
   (i) providing an apparatus having a bulk lubricating oil reservoir, a rotary shaft that passes through the bulk lubricating oil reservoir, and a rotary shaft seal;

wherein the rotary shaft seal has a sealing edge in proximity with the rotary shaft creating a contact zone;
wherein the contact zone has a film of lubricating oil; and
(ii) increasing the rate of heat flow along the rotary shaft to reduce temperature of the film of lubricating oil in the contact zone;
wherein increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

2. A method for controlling heat transfer in a contact zone, said method comprising:
(i) providing an apparatus having a bulk lubricating oil reservoir, a rotary shaft that passes through the bulk lubricating oil reservoir, and a rotary shaft seal;
wherein the rotary shaft seal has a sealing edge in proximity with the rotary shaft creating the contact zone;
wherein the contact zone has a film of lubricating oil; and
(ii) increasing the rate of heat flow along the rotary shaft to reduce temperature of the film of lubricating oil in the contact zone;
wherein increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

3. A method for improving performance of an apparatus, said method comprising:
(i) providing an apparatus having a bulk lubricating oil reservoir, a rotary shaft that passes through the bulk lubricating oil reservoir, and a rotary shaft seal;
wherein the rotary shaft seal has a sealing edge in proximity with the rotary shaft creating a contact zone;
wherein the contact zone has a film of lubricating oil; and
(ii) increasing the rate of heat flow along the rotary shaft to reduce temperature of the film of lubricating oil in the contact zone;
wherein increasing the rate of heat flow along the rotary shaft is accomplished by using rotary shaft materials of construction having sufficient high thermal conductivity, rotary shaft coatings having sufficient high thermal conductivities, or increasing the surface area of the rotary shaft.

4. A method for controlling lubrication of a rotary shaft seal, said method comprising:
(i) providing an apparatus having a bulk lubricating oil reservoir, a rotary shaft that passes through the bulk lubricating oil reservoir, and a rotary shaft seal;
wherein the rotary shaft seal has a sealing edge in proximity with the rotary shaft creating a contact zone;
wherein the contact zone has a film of lubricating oil; and
(ii) decreasing the rate of heat flow along the rotary shaft to increase temperature of the film of lubricating oil in the contact zone;
wherein decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

5. A method for controlling heat transfer in a contact zone, said method comprising:
(i) providing an apparatus having a bulk lubricating oil reservoir, a rotary shaft that passes through the bulk lubricating oil reservoir, and a rotary shaft seal;
wherein the rotary shaft seal has a sealing edge in proximity with the rotary shaft creating the contact zone;
wherein the contact zone has a film of lubricating oil; and
(ii) decreasing the rate of heat flow along the rotary shaft to increase temperature of the film of lubricating oil in the contact zone;
wherein decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

6. A method for improving performance of an apparatus, said method comprising:
(i) providing an apparatus having a bulk lubricating oil reservoir, a rotary shaft that passes through the bulk lubricating oil reservoir, and a rotary shaft seal;
wherein the rotary shaft seal has a sealing edge in proximity with the rotary shaft creating a contact zone;
wherein the contact zone has a film of lubricating oil; and
(ii) decreasing the rate of heat flow along the rotary shaft to increase temperature of the film of lubricating oil in the contact zone;
wherein decreasing the rate of heat flow along the rotary shaft is accomplished by using rotary shaft materials of construction having sufficient low thermal conductivity, rotary shaft coatings having sufficient low thermal conductivities, or altering the design of the rotary shaft.

7. The method of clauses 1-3 further comprising increasing the rate of heat flow along the rotary shaft to obtain a higher viscosity lubricating oil film in the contact zone, or increasing the rate of heat flow along the rotary shaft to obtain a thicker lubricating oil film in the contact zone, or increasing the rate of heat flow along the rotary shaft to reduce thermal stresses on the rotary shaft seal and lubricating oil film, thereby increasing the lifetime of the apparatus.

8. The method of clauses 4-6 further comprising decreasing the rate of heat flow along the rotary shaft to obtain reduced friction in the contact zone, thereby improving energy efficiency of the apparatus.

9. The method of clauses 1-3 wherein rotary shaft materials of construction having sufficient high thermal conductivity are selected from the group consisting of one or more of copper, bronze, aluminum, tungsten, graphite, brass, and iron.

10. The method of clauses 1-3 wherein rotary shaft coatings having sufficient high thermal conductivities are selected from the group consisting of one or more of gold, silver, bronze, aluminum, aluminum nitride, and zinc.

11. The method of clauses 1-3 wherein increasing the surface area of the rotary shaft, to increase the rate of heat flow along the rotary shaft, is accomplished by adding cooling fins.

12. The method of clauses 4-6 wherein rotary shaft materials of construction having sufficient low thermal conductivity are selected from the group consisting of one or more of stainless steel, metal oxides, glass, silica, polymers, epoxies and rubbers.

13. The method of clauses 4-6 wherein rotary shaft coatings having sufficient low thermal conductivities are selected from the group consisting of one or more of metal oxides, glass, silica, polymers, epoxies, rubbers, and diamond-like carbon.

14. The method of clauses 4-6 wherein altering the design of the rotary shaft, to decrease the rate of heat flow along the rotary shaft, is accomplished by including insulating air gaps.

15. The method of clauses 1-6 wherein the apparatus is selected from the group consisting of a gearbox, a pump, an electric motor, a hydraulic motor, a hydraulic actuator, an air compressor, a crankshaft, and a camshaft.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for controlling lubrication of a rotary shaft seal, said method comprising:
    (i) providing an apparatus having a bulk lubricating oil reservoir, a rotary shaft that passes through the bulk lubricating oil reservoir, and a rotary shaft seal; wherein the rotary shaft seal has a sealing edge connected to the rotary shaft creating a contact zone; wherein the contact zone has a film of lubricating oil; wherein the lubricating oil comprises one or more additives at a minimum % wt ranging from 0.2% to 2%; and
    (ii) increasing the rate of heat flow along the rotary shaft to reduce temperature of the film of lubricating oil in the contact zone;
    wherein increasing the rate of heat flow along the rotary shaft is accomplished by using rotary shaft materials of construction having high thermal conductivity, wherein rotary shaft materials of construction having high thermal conductivity are selected from the group consisting of one or more of copper, bronze, aluminum, tungsten, graphite, brass, and iron, rotary shaft coatings having high thermal conductivities, wherein rotary shaft coatings having high thermal conductivities are selected from the group consisting of one or more of gold, silver, bronze, aluminum, aluminum nitride, and zinc, or increasing the surface area of the rotary shaft, wherein increasing the surface area of the rotary shaft is accomplished by adding cooling fins.

2. The method of claim 1, wherein the rate of heat flow along the rotary shaft determines the initial temperature of the film of lubricating oil in the contact zone relative to the temperature of lubricating oil in the bulk lubricating oil reservoir.

3. The method of claim 1, wherein the rate of heat flow along the rotary shaft determines the extent to which friction from the rotary shaft increases the temperature of the film of lubricating oil in the contact zone.

4. The method of claim 1 further comprising increasing the rate of heat flow along the rotary shaft to obtain a higher viscosity lubricating oil film in the contact zone.

5. The method of claim 1 further comprising increasing the rate of heat flow along the rotary shaft to obtain a thicker lubricating oil film in the contact zone.

6. The method of claim 1 further comprising increasing the rate of heat flow along the rotary shaft to reduce thermal stresses on the rotary shaft seal and lubricating oil film, thereby increasing the lifetime of the apparatus.

7. The method of claim 1 wherein the rotary shaft is configured to drive an energy—converting device selected from the group consisting of a gearbox, a pump, an electric motor, a hydraulic motor, a hydraulic actuator, an air compressor, a crankshaft, and a camshaft.

8. The method of claim 1 wherein the lubricating oil is selected from the group consisting of a Group I base oil, Group II base oil, Group III base oil, Group IV base oil, Group V base oil, and mixtures thereof.

9. The method of claim 1 wherein the lubricating oil comprises one or more additives selected from the group consisting of an antiwear additive, viscosity modifier, antioxidant, detergent, dispersant, pour point depressant, corrosion inhibitor, metal deactivator, seal compatibility additive, antifoam agent, inhibitor, friction modifier, anti-rust additive, metal passivator, demulsifier, and combinations thereof.

* * * * *